United States Patent

[11] 3,617,748

[72] Inventor Henry Roy Chope
    Columbus, Ohio
[21] Appl. No. 725,873
[22] Filed May 1, 1968
[45] Patented Nov. 2, 1971
[73] Assignee Industrial Nucleonics Corporation

[54] ANGLE TRACKER WITH CORRECTION MEANS HAVING TRANSFER FUNCTION INVERSELY RELATED TO SENOR TRANSFER FUNCTION
13 Claims, 4 Drawing Figs.

[52] U.S. Cl. .................................... 250/83.3,
    250/105, 318/18
[51] Int. Cl. .................................... G01t 1/17
[50] Field of Search .......................... 250/83.3,
    71.5, 105, 106; 318/18 X, 20.605, 20.435

[56]                References Cited
           UNITED STATES PATENTS
2,470,099   5/1949  Hall ........................... 318/20.435
2,767,361  10/1956  Blomgvist et al. ............. 318/20.435
3,041,518   6/1962  Blomgvist et al. ............. 318/20
3,291,990  12/1966  Lentz .......................... 250/83.3

Primary Examiner—Archie R. Borchelt
Assistant Examiner—Morton J. Frome
Attorneys—Lowe and King, William T. Fryer, III, C Henry Peterson and James J. O'Reilly ABSTRACT: A position tracker that is arranged in one embodiment for use with a nucleonic source includes a sensor unit having a nucleonic detector for deriving a signal indicative of the deviation angle between the sensor unit pointing direction and the direction of the nucleonic source The sensor unit output is fed in parallel to motive means for driving the sensor unit, to reduce the signal and to a correction network for deriving another signal directly proportional to the deviation angle. The correction network has a transfer function that is the reciprocal of the transfer function of the sensor unit. An indication of the sensor unit pointing direction is summed with the output of the correction network to derive a signal directly proportional to the true or actual direction of the source. The true angle indication is combined with other similar signals in a computer, the output of which is a signal proportional to the range between the source and sensor unit. The range indication is fed back to the correction network to control the gain factor thereof.

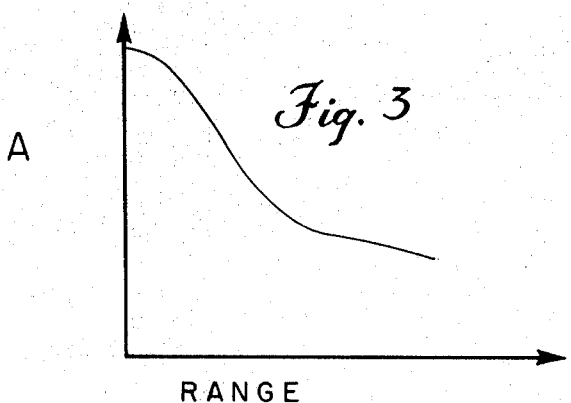
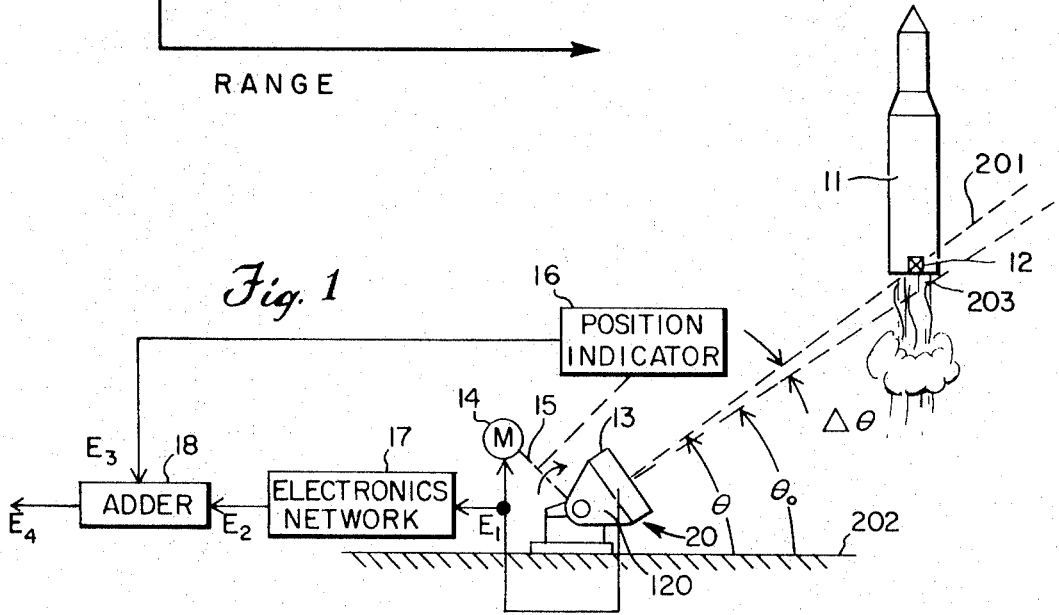
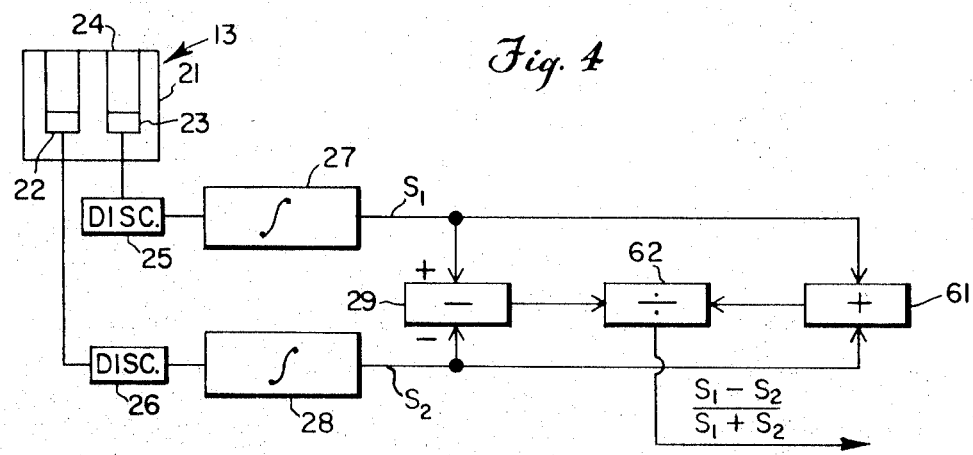

ANGLE TRACKER WITH CORRECTION MEANS HAVING TRANSFER FUNCTION INVERSELY RELATED TO SENOR TRANSFER FUNCTION

The present invention relates generally to tracking systems and, more particularly, to a tracker for deriving an error signal indicative of the deviation angle between a sensor unit pointing direction and the direction of an energy source being tracked, in combination with a network for deriving a signal directly proportional to the deviation angle. The pointing direction of the sensor unit forms an angle with a reference datum and the direction of the source from the tracker forms an angle with the same reference datum. The angular difference between these angles is being measured.

One typical class of prior art systems for tracking the position of an energy source includes a sensor unit mounted on a platform wherein the sensor unit derives an error signal indicative of the deviation angle between the pointing direction thereof and the direction of the energy source. The error signal is fed to a platform motive means to minimize the sensor unit error signal and an indication of the energy source position is derived by monitoring the angular position of the platform.

A problem inherent with tracking systems of the class described is the inherent lag between the platform position and the actual position of an energy source being tracked. The platform lag is reflected in the accuracy of the positional indication derived.

In accordance with one aspect of the present invention, a correction network is provided whereby the error signal derived from a sensor unit in a system of the described class is modified in a network having a predetermined transfer function that derives a signal directly proportional to the deviation angle between the sensor unit pointing direction and the true direction of the target being tracked. The output signal of the correction network is linearly combined with the indication of the platform position to derive a signal having an amplitude directly proportional to the target angular position.

It might appear that the sensor unit error signal and the platform positional indication could be combined directly to provide the true angle indicating signal. It has been found, however, that the sensor unit error signal is not directly proportional to the deviation between the sensor unit pointing direction and the true direction of the energy source, whereby a direct addition of the error signal and an indication of the platform position would produce inaccurate true angle indications.

According to the present invention, I have found that the sensor unit error signal can be translated into a signal directly proportional to the deviation angle by feeding the error signal to a correction network having a transfer function that is the reciprocal of the sensor unit transfer function.

One problem in synthesizing the correction network is that the amplitude of the tracker output signal is inversely related with the range of the tracked target. To maintain the output signal of the correction network directly proportional to the deviation angle for all ranges, the network gain is controlled in accordance with the reciprocal of the range versus tracker sensitivity relationship. To this end, range is calculated from the output signals derived from a plurality of tracking channels and controls the gain factor of the correction network in each of the angle tracking channels.

It is, accordingly, an object of the present invention to provide a new and improved system for deriving indications of the true angular position of a target being tracked.

Another object of the present invention is to provide a new and improved system for deriving accurate indications of the angular position and range of a target.

A further object of the present invention is to provide a new and improved tracker wherein the tracker error signal is translated into a signal directly proportional to the deviation angle between the tracker pointing direction and the true direction of a target.

Another object of the present invention is to provide a new and improved system for deriving a signal accurately reflecting the true direction angle of a target from an indication of the pointing angle of the sensor unit.

Another object of the present invention is to provide a new and improved system for tracking the position of nuclear energy sources.

Another object of the present invention is to provide a tracking system wherein an error signal derived from a sensor unit is transformed into a signal directly proportional to the deviation angle between the sensor unit direction and the true direction of a target being tracked, despite wide variations in range between the sensor unit and target.

The above and still further objects, features and advantages of the present invention will become apparent upon consideration of the following detailed description of several specific embodiments thereof, especially when taken in conjunction with the accompanying drawings, wherein:

FIG. 1 is an elevation view schematically illustrating a system for tracking the position of an energy source;

FIG. 3 is a curve illustrating the sensitivity of the tracking sensor unit of FIG. 1; and FIG. 4 is a circuit diagram of a portion of another embodiment of the invention.

Figure 2:
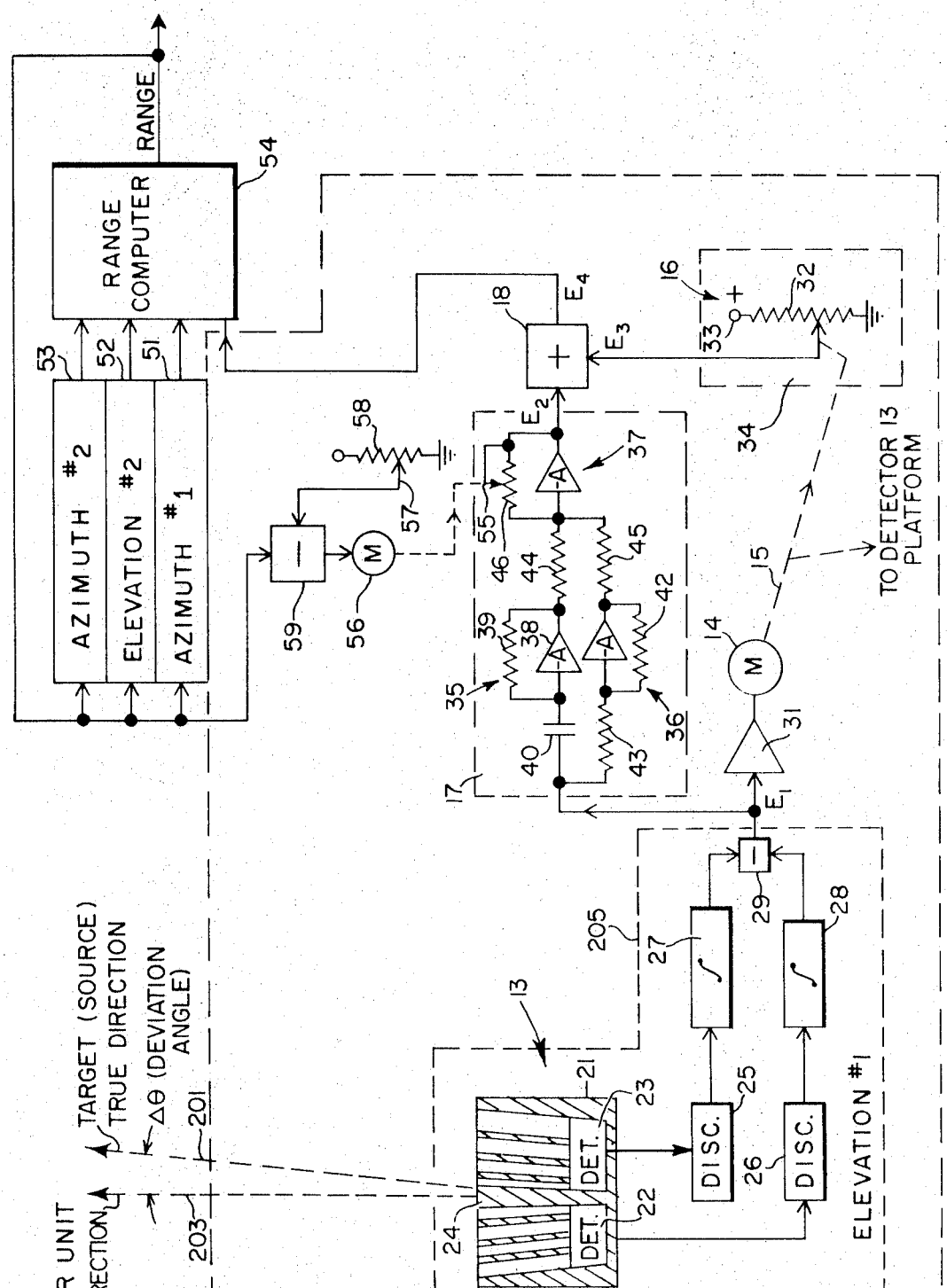
FIG. 2 is a partial circuit and partial block diagram illustrating a preferred embodiment of the present invention.

The present invention is described specifically in conjunction with a system for tracking the position of a nucleonic, penetrating radiation source. It is to be understood, however, that the broad principles of the invention are equally applicable to detecting the position of active and passive energy sources, such as electromagnetic and sound waves, such as exist in radar and sonar systems. In this connection, the term "energy source" in the claims is to be interpreted as sources of both active and passive types.

Reference is now made to FIG. 1 of the drawings wherein there is illustrated missile 11 carrying source 12 of penetrating radiation, which source is preferably of the nucleonic, gamma ray type. The true direction position of source 12 from tracker 20 is represented by line 201 that forms angle $\theta$ between the line 201 and the horizon datum 202, represented by the plane of the earth surface (at right angle to the drawing sheet). Tracker 20 has a gamma ray sensor unit 13. The pointing direction of sensor unit 13, represented by line 203 from tracker 20 forms an angle $\theta_o$ with reference datum 202, and is not coincident with line 201, deviating therefrom by an angle $\Delta\theta$ in a plane at right angles to horizon datum 202. Sensor unit 13 includes circuit means for deriving an error signal $E_1$ indicative of $\Delta\theta$, the angular difference between the true direction of source 12, line 201, and the pointing direction of sensor unit 13, line 203, to actuate motor 14. Shaft 15 of motor 14 rotates sensor unit 13 and platform 20 about a horizontal axis in a manner tending to reduce the deviation angle $\Delta\theta$.

To provide an indication of the approximate angle of missile 11 and source 12 above the reference datum 202 and the exact pointing direction angle of sensor unit 13, shaft 15 is coupled to a position transducer 16. The output of transducer 16 is $E_3$ that is linearly combined in adding network 18 with a signal $E_2$ directly proportional to the deviation angle, $\Delta\theta$, derived by electronics network 17, which is driven from the output error signal $E_1$ of sensor unit 13. Summing network 18, thereby, derives an output signal $E_4$ directly proportional to $\theta$, in the elevation plane.

Coupled with, and at the same site as, sensor unit 13 is a further sensor unit (not shown) on tracker 20 for deriving a signal indicative of the true azimuth angle of source 12 relative to the azimuth-pointing direction of the further sensor unit on platform 20. At another location, a known distance from platform 20, is located a second pair of sensor units for deriving signals indicative of the true azimuth and elevation angles of source 12 relative to the position of the second station. The true angle position signals derived from the four channels are fed to a range computer, which can be of a known type, which derives an output signal directly proportional to the range between source 12 and a reference point between the two sensor unit stations.

The mathematical analysis for the conclusion that the deviation angle $\Delta\theta$ can be derived in response to the error signal being coupled through a correction network having a transfer function equal to the reciprocal of the sensor unit transfer function is obtained by letting:

- $\theta$ = the true angular direction of a target being tracked from a reference datum;
- $\theta_0$ = the angle formed between the pointing direction of the sensor unit and the same reference datum;
- $F_1$ = the sensor unit transfer function;
- $F_2$ = the transfer function of the sensor unit platform motive means;
- $M$ = the transfer function of the correction network;
- $\theta_M$, the output of a linear summing network having a transfer function of one, $=\Delta\theta+\theta_0$;
- $\Delta\theta$ = the output of the correction network; and
- $e$, the deviation angle, $=\theta-\theta_0$.

Hence, the sensor unit output, $E_1$ is defined by the relation
$$E_1=eF_1 \quad \text{Equation (1)}$$
The angular position, $\theta_0$, of the platform is defined by the relation
$$\theta_0=E_1F_2 \quad \text{Equation (2) Substituting for } E_1 \text{ from equation (1),}$$
$$\theta_0=eF_1F_2 \quad \text{Equation (3) The output of the correction network, } \Delta\theta, \text{ is defined by the relation}$$
$$\Delta\theta=E_1M \quad \text{Equation (4) Substituting for } E_1 \text{ from Equation 1,}$$
$$\Delta\theta=eF_1M \quad \text{Equation (5) The output of the summing network, } \theta_M, \text{ is defined by the relationship}$$
$$\theta_M=\theta_0+eF_1M \quad \text{Equation (6) Equation 6 can be transformed into}$$
$$\theta_M=\theta_0+(\theta-\theta_0)F_1M \quad \text{Equation (7) The actual position of the sensor unit and platform, } \theta_0, \text{ can be defined by the relation}$$
$$\theta_0=eF_1F_2 \quad \text{Equation (8) that can be transformed to}$$
$$\theta_0=(\theta-\theta_0)F_1F_2 \quad \text{Equation (9) Solving equation (9) for } \theta_0 \text{ yields}$$
$$\theta_0=F_1F_2\theta/1+F_1F_2 \quad \text{Equation (10) By substituting } \theta_0 \text{ into the expression for } \theta_M, \text{ in equation (7)}$$

$$\theta_M=\frac{F_1F_2\theta}{1+F_1F_2}=F_1M\theta-\frac{F_1^2F_2M\theta}{1+F_1F_2}. \quad (11)$$

Equation 11 for $\theta_M$ can be simplified to:

$$\theta_M=\theta\left(\frac{F_1F_2}{1+F_1F_2}+\frac{F_1M}{1+F_1F_2}\right). \quad (12)$$

The error in $\theta_M$ from the actual angular position of the energy source, $\theta$, is written as:

$$\theta-\theta_M=\left(\frac{1+F_1F_2-F_1F_2-F_1M}{1+F_1F_2}\right)\theta \quad (13)$$

To reduce the error in $\theta_M$ to zero, the numerator of the preceding expression is equated to zero, which is achieved by setting $M=1/F_1$. Since $M$ and $F_1$ are respectively the transfer functions of the correction network and sensor unit, the output signal of the correction network is directly proportional to the deviation angle.

The sensor unit transfer function can be determined by utilizing known experimental procedures. For many types of tracking systems, however, the transfer function may be relatively complex and the reciprocal thereof of a similar, if not greater, complexity. In accordance with another aspect of the present invention, the sensor unit transfer function can be accurately represented as a relatively simple low-pass filter or integration network by utilizing sources and detectors of the nucleonic-type. The reciprocal of a low-pass filter transfer function is synthesized in a relatively facile manner as a differentiating network and a linear combining circuit.

One preferred embodiment for the particular sensor unit and motor arrangement is described and illustrated in the U.S. Pat. No. to Lentz 3,291,990, issued Dec. 13, 1966, and commonly assigned with the present invention. Because the sensor unit and drive apparatus are disclosed fully in the Lentz patent, they are described and illustrated herein only in broad, schematic terms.

As illustrated by FIG. 2, and in accordance with one of the embodiments of the Lentz patent, the sensor unit includes a heavy lead shield 21, having a pair of separate gamma ray detectors 22 and 23 responsive to energy from penetrating radiation source 12. Detectors 22 and 23 are isolated from each other by plate 24, whereby the difference in the count rates derived thereby is a function of the deviation angle $\Delta\theta$, FIG. 1.

The count rate outputs of gamma ray detectors 22 and 23 are fed to amplitude discriminators 25 and 26, respectively. Discriminators 25 and 26 respond to the variable amplitude and duration pulses derived by detectors 22 and 23 to derive, in accordance with conventional techniques a series of pulses with the pulse rate being a function of the amount of gamma ray energy reaching each of the detectors. To eliminate the effect of stray gamma ray radiation coupled to detectors 22 and 23, discriminators 25 and 26 include a threshold network whereby they derive a 0 amplitude signal in response to the outputs of detectors 22 and 23 being less than a predetermined amplitude.

The energy indicating pulses derived from discriminators 25 and 26 are respectively fed to identical resistance capacitance integrators 27 and 28, which function as low-pass filters for deriving DC signals having amplitudes proportional to the amount of gamma ray radiation impinging on detectors 22 and 23 from gamma ray source 12. The output signals of integrators 27 and 28 are applied respectively as the minuend and subtrahend inputs of DC analog subtraction network 29. Subtraction network 29 derives a DC output signal $E_1$ related to the deviation angle, $\Delta\theta$. As indicated supra, the error signal $E_1$ derived from subtracter 29 cannot be equated directly with the deviation angle, $\Delta\theta$.

The detectors 22 and 23 and the electronic signal processing devices, discriminators 25 and 26, integrators 27 and 28 and subtractor 29 make up the components for the sensor unit 13, represented by the units within the dotted-line box 205 to produce the signal $E_1$ that is a function of $\Delta\theta$. Other detectors and signal processing units can be used to develop a signal corresponding to signal $E_1$.

The deviation angle signal $E_1$ can, however, be utilized effectively as a control signal for activating motor 14 so that it drives platform 120, carrying sensor unit 13, toward source 12. To this end, the output of subtractor 29 is fed to motor 14 by way of power amplifier 31. Because of the substantial inertia of platform 120 carrying sensor unit 13, there is a substantial difference, at times, between $\theta$ and $\theta_0$. This lag is represented in the equations of the introduction by the transfer function $F_2$, which includes LaPlace transform terms involving the LaPlace operator (designated as $s$).

The true position of platform 20 is derived by position transducer 16 that is coupled to motor shaft 15. Position transducer 16 comprises potentiometer 32, excited by a positive DC voltage at terminal 33, and slider 34 that is driven by shaft 15. The voltage at tap 34, corresponding to $E_3$ is fed to an analog summing network 18.

To convert the angular deviation signal $E_1$ derived by subtractor 29 into a signal directly proportional to the deviation angle, $\Delta\theta$, the subtracter output is fed to electronic network 17, having a transfer function equal to the reciprocal of the transfer function of sensor unit 13. The transfer function of sensor unit 13, using nucleonic detectors, can be approximated to a very large degree as a simple low-pass filter or integrating network, having a transfer function of:

$$\frac{A}{s+\frac{1}{RC}} \quad (14)$$

where:

$A$ = a constant determined by the characteristics of sensor unit 13,
$s$ = the LaPlace transform operator,
$R$ = the resistance in each of integrators 27 and 28, and
$C$ = the value of the capacitor in each of integrators 27 and 28.

The nucleonic detector can be represented as a simple RC integrating network because of the predominant nature of integrators 27 and 28 on the time-varying signals derived thereby. In the introductory equations, the transfer function of the sensor unit, $F_1$, is equated to $$\frac{A}{s+\frac{1}{RC}}$$

and the detector output signal can be written as:

$$E_1 = \frac{A(\theta-\theta_0)}{s+\frac{1}{RC}} \quad (15)$$

To synthesize the reciprocal of the sensor unit transfer function, $$\frac{s+\frac{1}{RC}}{A},$$

electronics network 17 includes differentiating network 35. Differentiating network 35, which synthesizes the term $s$, includes DC, operational amplifier 38 having resistor 39 and capacitor 40 respectively connected in the feedback and input circuits thereof. Inverting network 36, which synthesizes the quantity $1/RC$, includes resistors 42 and 43 in the feedback and input circuits thereof, respectively. Resistors 42 and 43 are selected so that the quotient of the values thereof is directly proportional to the RC time constant of integrators 27 and 28. The output responses of differentiator 35 and inverting network 36 are combined in summing amplifier 37, which includes input resistors 44 and 45 and feedback resistor 46. The values of resistors 44 and 45 are selected to be equal and the value of resistor 46 is designed to be proportional to the quantity $1/A$, thereby to synthesize the inverse amplitude response of sensor unit 13.

While a specific correction network 17 for deriving an output signal directly proportional to the true deviation angle, $\Delta\theta$, has been described, it is to be understood that more complex correction networks may be necessary with other types of sensor units. In such an event, the sensor unit transfer function is determined by utilizing relatively well-known procedures wherein the sensor unit frequency response for a plurality of discrete frequencies is derived. Once the sensor unit transfer function has been ascertained, the transfer function of correction network 17 is determined from the reciprocal of the sensor unit transfer function. From existing synthesizing techniques, the reciprocal of the sensor unit transfer function can be equated with known circuit elements.

The true elevation angle of source 12 is derived by DC summing network 18 that is responsive to the output signals of network 17 and position transducer 16. Similar signals respectively indicative of the true azimuth angle of source 12 relative to the site of sensor unit 13, and the azimuth and elevation angles of source 12 relative to a second sensor unit site are derived from channels 51-53, which contain circuitry identical to that described in conjunction with sensor unit 13. The elevation and azimuth angle signals from the four channels are combined in range computer 54, which derives an output signal indicative of the position of missile 11 relative to a reference point, between the two sensor unit sites. Range computer 54 solves the well known formulas of solid geometry wherein the distance between first and second points can be calculated by knowing the distances between the second point and each of a third and a fourth point and the angles between the first point and each of the third and fourth points. In the present instance, the first point is source 12, the second point is the reference point between the sensor unit sites, and the third and fourth points are the two sensor unit sites.

The range indicating signal derived from computer 54 is fed back to each of channels 51-53 and the channel associated with sensor unit 13. The range signal controls the gain factor introduced by network 17 so that the gain factor equals the reciprocal of the gain factor of sensor unit 13.

In this regard, the gain factor, $A$, of sensor unit 13 decreases as an inverse function of range, as indicated by FIG. 3. This is the expected result since the amount of gamma radiation from source 12 reaching sensor unit 22 and 23 decreases as an inverse exponential function of distance. The number of pulses derived by discriminators 25 and 26 decreases with increasing values of range between source 12 and sensor unit 13 and the amplitude or gain factor of the circuitry associated with each of integrators 27 and 28 decreases accordingly.

According to one aspect of the present invention, the gain factor of correction network 17 is maintained equal to the reciprocal of the gain factor of the circuitry associated with sensor unit 13 by adjusting the value of resistor 46 so that it is equal to the reciprocal of the gain factor of sensor unit 13 regardless of the range of source 12. To this end, resistor 46 is a nonlinear resistor having a card cut in accordance with the reciprocal of the gain versus range curve of FIG. 3. Resistor 46 includes a slider 55 that is driven in response to the range indication output of computer 54 to establish a gain factor for summing amplifier 37 that equals the reciprocal of the gain factor of sensor unit 13. Slider 55 is driven to a position commensurate with the range calculated by computer 54 by servomotor 56. Servomotor 56 is connected in circuit with slider 57 of the followup potentiometer 58 and subtraction network 59 that is responsive to the difference between the amplitudes of the voltages derived by computer 54 and at slider 57. Thereby, motor 56 drives slider 55 to a position along resistor 46 commensurate with the range between missile 11 and the approximate position of detector 13. In a similar manner, the gain factors of the correction networks in each of channels 51-53 are varied in response to the range between source 12 and the approximate positions of the sensor unit sites.

In accordance with another embodiment of the invention, the error signal amplitude is relatively dependent of the range between sensor unit 13 and source 12, to obviate the need for adjusting the gain factor of correction network 17. In particular, the error signal is normalized with regard to range by dividing the output of subtracter 29 by a signal indicative of the sum of the counts derived from sensor units 22 and 23.

Referring now particularly to the second embodiment, illustrated by FIG. 4, the DC output voltages $S_1$ and $S_2$ of integrators 27 and 28, respectively, are added together in an analog summing network 61. The sum and difference signals respectively derived from adder 61 and subtracter 29 are applied as numerator and divider input signals to DC analog-computing dividing network 62, the output of which is a quotient signal proportional to the difference between the count rates of detectors 22 and 23 divided by the count rate sum. The output voltage of divider 62 is normalized with regard to range because as range increases the count rate decreases, whereby the divisor input to divider 62 also decreases. Because of similar decreases in the count rate and input signals to divider 62, the divider quotient output signal is relatively insensitive to range variations between sensor unit 13 and source 12.

The error output signal of divider 62 is applied in parallel to motor 14 and correction network 17, which are substantially the same as described supra with regard to FIG. 2. The only difference is that with the system of FIG. 4, nonlinear resistor 46 and the drive circuit therefor can be replaced with a constant value resistor.

While there has been described and illustrated several specific embodiments of the invention, it will be clear that variations in the details of the embodiments specifically illustrated and described may be made without departing from the true spirit and scope of the invention as defined in the appended claim.

I claim:

1. A system for determining the position of a moving energy source comprising a sensor unit for the energy, said sensor unit including means for deriving an error signal indicative of the angle of the energy source relative to the sensor unit pointing angle, said sensor unit having a transfer function $F_1(s)$, means responsive to the error signal for driving the sensor unit to point toward the source, correction means having a transfer function directly proportional to $1/F_1(s)$ responsive to the error signal for deriving a first signal directly proportional to the angle between the sensor unit pointing direction and the actual direction of the source, means coupled to the sensor unit for deriving a second signal indicative of the pointing direction of the sensor unit, and means for linearly combining said first and second signals to derive a third signal directly proportional to the direction angle of said source.

2. The system of claim 1 further including means responsive to the energy source for deriving a signal indicative of the range between the source and sensor unit, and means for controlling a gain factor of the correction means in response to the range signal.

3. The system of claim 2 wherein the source is of the penetrating-radiation-type and the sensor unit is responsive to penetrating radiation.

4. The system of claim 3 wherein the correction means includes a differentiating network.

5. The system of claim 1 wherein the source is of the penetrating-radiation-type and the sensor unit is responsive to penetrating radiation.

6. The system of claim 5 wherein the correction means includes a differentiating network.

7. A system for determining the position of a moving energy source, comprising four sensor units for the energy, a pair of said four sensor units being located at one site for deriving first azimuth and elevation angle error signals, a second pair of said sensor units being located at a second site for deriving second azimuth and elevation angle error signals, means separately responsive to each of said sensor unit for deriving a signal indicative of the true angle of the source relative to the sensor unit, each of said true angle deriving means including: means responsive to the error signal for driving the sensor units to point toward the source, correction means having a transfer function directly proportional to $1/F_1(s)$ responsive to the error signal for deriving a first signal direction proportional to the elevation or azimuth angle between the sensor unit pointing direction and the actual direction of the source, where $F_1(s)$ is the transfer function of the sensor unit feeding the correction means, means coupled to the sensor unit for deriving a second signal indicative of the pointing direction of the sensor unit, and means for linearly combining said first and second signals; and computer means responsive to each of said linear combining means for deriving an indication of the range between the source and a reference point.

8. The system of claim 7 further including means for controlling a gain factor of each correction means in response to the range indication.

9. In a system for determining the true angular position of a moving energy source, a sensor unit for the energy, said sensor unit including means for deriving a first signal indicative of the angle of the energy source relative to the sensor unit pointing angle, said sensor unit having a transfer function $F_1(s)$, correction means having a transfer function directly proportional to $1/F_1(s)$ responsive to said first signal for deriving a second signal directly proportional to the angle between the sensor unit pointing direction and the actual direction of the source, means coupled to the sensor unit for deriving a third signal indicative of the pointing direction of the sensor unit, and means for linearly combining said first and second signals to obtain a fourth signal indicative of the true angular position of said source.

10. In a system for determining the position of a moving energy source, a sensor unit for the energy, said sensor unit including means for deriving a first signal indicative of the angle of the energy source relative to the detector pointing angle, said sensor unit having a transfer function $F_1(s)$, and means having a transfer function directly proportional to $1/F_1(s)$ coupled to the sensor unit for deriving a second signal directly proportional to the angle between the sensor unit pointing direction and the actual direction of the sensor unit.

11. The system of claim 10 further including means responsive to the energy source for deriving a signal indicative of the range between the source and sensor unit, and means for controlling a gain factor of the correction means in response to the range signal.

12. The system of claim 11 wherein the source is of the penetrating-radiation-type and the sensor unit is responsive to penetrating radiation.

13. The system of claim 12 wherein the correction means includes a differentiating network.

* * * * *